Figure 1:
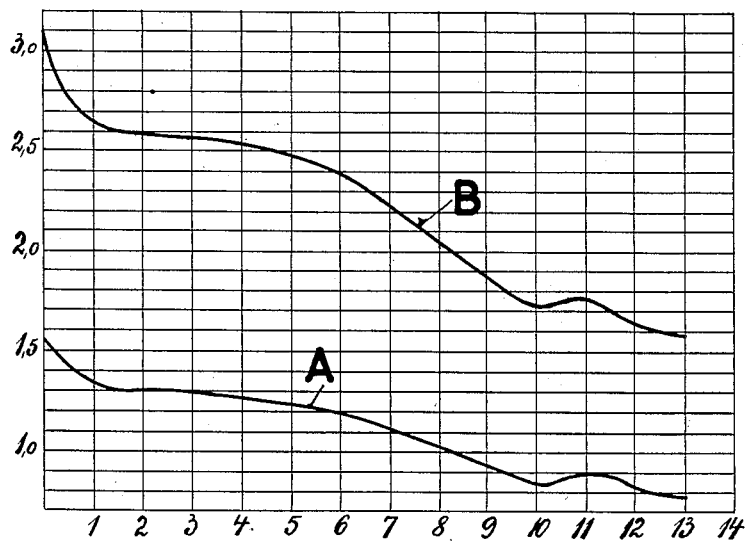

W. HICKMANN.
ELECTRIC MINER'S LAMP.
APPLICATION FILED JULY 17, 1911.

1,174,146. Patented Mar. 7, 1916.

Witnesses:
CJ Dulin
HCHunsberger

Inventor
Wilhelm Hickmann
by B. Singer
Attorney

UNITED STATES PATENT OFFICE.

WILHELM HICKMANN, OF GRIESHEIM, NEAR FRANKFORT-ON-THE-MAIN, GERMANY, ASSIGNOR TO CHEMISCHE FABRIK GRIESHEIM ELEKTRON, OF FRANKFORT-ON-THE-MAIN, GERMANY.

ELECTRIC MINER'S LAMP.

1,174,146.　　　Specification of Letters Patent.　　Patented Mar. 7, 1916.

Application filed July 17, 1911. Serial No. 638,985.

*To all whom it may concern:*

Be it known that I, WILHELM HICKMANN, chemical engineer, a citizen of Germany, residing at Griesheim, near Frankfort-on-the-Main, Germany, have invented new and useful Improvements in Electric Miners' Lamps, of which the following is a specification.

The only sources for electric miners' lamps that need be considered in practice are secondary batteries and dry cells, the mechanical and electrical properties of which are generally known. If these two sources of current are compared it may be said that electrically the secondary battery is superior to the dry cell, but mechanically the dry cell is superior to the secondary battery.

As regards electrical property the secondary battery if carefully handled has a very long life and can be recharged a great number of times. Moreover its E. M. F. falls but little during discharge. The dry cell on the other hand has only a short life, cannot be recharged and its E. M. F. falls considerably.

As to the mechanical side a secondary battery must be carefully protected from jarring, shocks and so forth. It is very heavy and its prime cost is very high. The dry cell on the other hand is not very sensitive to shocks and so forth. It has a much smaller weight and its prime cost is much less. In the secondary battery moreover the electrolyte is especially a cause of trouble, while no difficulties at all arise from this source in the dry cell.

Now of the properties mentioned the fall of E. M. F. is particularly important in supplying electric miners' lamps, and it is considerably greater in dry cells than in secondary batteries; for the E. M. F. of the source is the most important factor determining the candle power of the lamp. As is well known the candle power does not vary directly with the E. M. F. but with a high power of it. If for example the E. M. F. falls by only 10 per cent. the candle power of the lamp may diminish by 50 per cent. or more. Further incandescent lamps with metal filaments are particularly sensitive to variations of E. M. F. and yet such lamps must be used for electrical miners' lamps on the grounds of economy because they give very much more light with the small current available than incandescent lamps with carbon filaments would do. While carbon filaments will stand the excess E. M. F. without suffering much damage, lamps with metal filaments easily burn out if the E. M. F. goes but little over the allowable limit.

From what has been said it may be understood that the supply of electric miners' lamps by dry cells involves very special difficulties although mechanically such a source of supply has great advantages. The difficulties are moreover still greater when it is remembered that a miners' lamp must be as light as possible and therefore must contain as few secondary cells or dry cells as possible. Practically speaking the number is restricted to two, for these suffice to give current of sufficient strength and E. M. F. But if only two cells are used that excludes a whole number of possible methods of keeping the E. M. F. approximately constant which would otherwise come under consideration. Resistances cannot be used because the current is so small without them that it must not be made any smaller. Further resistance regulators and devices working after the fashion of cell switches are not at all permissible in miners' lamps since they have to go into the hands of unskilled workmen.

According to the present invention these difficulties are overcome by using in series two dry cells in different conditions of E. M. F. for each supply period. By this means on the one hand the variations of E. M. F. at the terminals of the incandescent lamp are in the simplest possible way kept within allowable limits and on the other hand the useful life of the dry cell is considerably increased.

Figure 2:
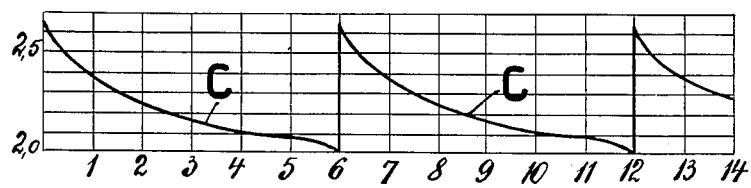
Figure 3:
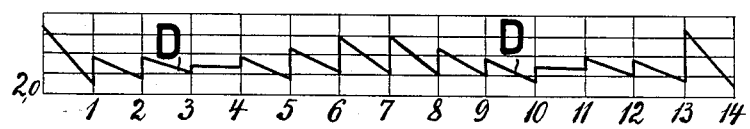

In the drawing Figures 1 to 3 show curves of E. M. F. for two cells connected in series in different ways.

In all three figures the abscissæ are units of time of 10 hours and the ordinates are the corresponding values of E. M. F. in volts. These units of time correspond approximately to the length of the working shift including the time taken for the miner to go into and come out of the mine.

In Fig. 1 A indicates the curve of the E. M. F. of a single dry cell which supplies current during 13 shifts without interruption. This curve shows the average value from a great number of experiments. Since the initial E. M. F. is about 1.56 volts and the final E. M. F. about 0.79 volts, there is a fall of E. M. F. of 0.77 volts, i. e., some 49 per cent. of the initial E. M. F. If two dry cells in the same condition of E. M. F. are connected in series the E. M. F. curve is given by B in Fig. 1 which of course shows the same percentage fall of E. M. F. namely 49 per cent. of the initial E. M. F. No such fall of the E. M. F. could possibly be permitted even if lamps with carbon filaments were used. Practically, however, only the part of curve B extending over 9 shifts can be used, so that the final E. M. F. is then 1.86 volts. Thus even in this shortened period of supply the fall of E. M. F. is still 1.24 volts, that is 40 per cent. of the initial E. M. F. According to the invention a much smaller fall of E. M. F. is attained by using in series for each period of supply, a fresh dry cell and one half exhausted, e. g. one that has already supplied current during six shifts. The curve of the E. M. F. for this case is shown in Fig. 2 and marked C. Here the initial E. M. F. is 2.62 volts and the final E. M. F. after six shifts is 2.01 volts, so that the fall of E. M. F. is only 0.61 volts, that is 23 per cent. of the initial E. M. F. After six shifts the originally half exhausted and now wholly exhausted cell is replaced by a fresh one. The curve of the E. M. F. therefore rises again suddenly to 2.62 volts to fall once more to 2.01 volts at the end of the twelfth shift. Now the first cell which was fresh at the beginning of the period but which in the meanwhile has become completely exhausted, is replaced in the same way by a third fresh cell, so that the curve of the E. M. F. again rises to 2.62 volts and so on. If this method is continued it is of course necessary to change one of the cells in every six shifts. That, however, is of no importance because in any case the lamps must be opened after each shift for inspection. At the same time the useful life of the cells which would otherwise be practically only nine shifts can be increased say to 12 shifts without the E. M. F. of the cell falling below the useful limit. By a further development of the idea above set out a still further diminution of the fall of E. M. F. may be attained, by in the first place changing one cell every shift and in the second place using two cells in series of such different conditions of E. M. F. that the algebraic sum of the shifts during which the cells have already been in use is less by one than the number of shifts for which a cell can be used without its E. M. F. falling beneath the limit of practical usefulness. For example suppose 14 shifts is the maximum useful life. Then according to the invention each incandescent lamp is supplied by one quite fresh cell and one cell that has already been in use for 13 shifts, or by one cell that has been in use for one shift and one that has been in use for 12 shifts, or by a cell which has been in use for 2 shifts and another that has been in use for 11 shifts and so on.

In Fig. 3 of the drawing D indicates the curve of E. M. F. for this case it being supposed that one of the two cells remains in the lamp during the whole time of use and is connected in series with a different cell for each shift. The maximum fall of E. M. F. then occurs during the first and fourteenth shifts, in which a fresh cell is connected with another that has been in use during 13 shifts. In this case the initial E. M. F. is 2.34 volts and the final E. M. F. 2.05 volts, so that the fall of E. M. F. is only 0.29 volts, that is 12 per cent. of the initial E. M. F. On the other hand during the fourth and eleventh shifts there is no fall of E. M. F. at all. Besides the diminution of the fall of E. M. F. a considerable prolongation of the working life of the cells can be secured if they are allowed to recover after they have been in use for one shift. It has been shown by experiment that the recovery of the cell that has been in use for 10 hours is complete if it is allowed to rest some 60 to 70 hours and that by allowing such a time of recovery after every use of the cell may be caused to supply current for 16 shifts of 10 hours each without the E. M. F. falling beneath the allowable limit. Obviously that imports also a further diminution in the fall of E. M. F. during each shift amounting to several per cent. of the initial E. M. F.

In carrying out the last described method of using miners' lamps the procedure may for example be as follows: Suppose that each cell can be used for 16 shifts of 10 hours. Each lamp contains two cells which are selected according to the rule given above. At the change of shift the miners put their lamps on the lamp stand. Here they are opened, the cells are taken out and are left idle for 70 hours. During this time they recover more or less according to their degree of exhaustion. When the time has elapsed the cells are tested by connection of their terminals to a voltmeter. The scale of the voltmeter may advantageously give instead of volts the number of shifts during which the cell has already been in use which of course may be determined from the terminal E. M. F. The cells are sorted according to the results given by the voltmeter test and are arranged in receptacles which may suitably bear indications of the number of shifts during which the cells in them have been in use. In receptacle 0 there would be fresh cells. In receptacle 1 cells which have been in use during one shift and so on. The cells are now simply put two by two in the lamps being so selected that the sum of the numbers by which the receptacles from which they are taken are indicated is always equal to 15, that is a cell from receptacle 0 is put with one from receptacle 15 or one from receptacle 5 is put with one from receptacle 10 or one from receptacle 7 with one from receptacle 8 and so on.

I claim:—

A method of operating miners' lamps which consists of supplying each lamp with current furnished by two cells, each of which is adapted, in virgin condition, to furnish an E. M. F. of practical usefulness for a certain working period of a predetermined number of shifts, each shift of relatively long duration, said two primary cells being selected in accordance with the number of shifts during which each of them has been in use, so that the sum of shifts during which both of the cells selected have been in use is smaller by one than the said working period.

In testimony whereof I affix my signature in presence of two witnesses.

WILHELM HICKMANN.

Witnesses:
 JEAN GRUND,
 CARL GRUND.